United States Patent
Zaun et al.

[19]

[11] Patent Number: 6,065,548
[45] Date of Patent: May 23, 2000

[54] SPRING TRIP STANDARD HAVING REDUCED SPRING BUCKLING FORCES

[75] Inventors: Richard David Zaun; Richard Wayne Hook, both of West Des Moines, Iowa

[73] Assignee: Deere & Company, Moline, Ill.

[21] Appl. No.: 09/325,454

[22] Filed: Jun. 3, 1999

[51] Int. Cl.[7] .................................................. A01B 61/04
[52] U.S. Cl. .......................................... 172/265; 267/178
[58] Field of Search .................................. 172/705, 265, 172/264, 263, 262, 261, 707, 708, 709, 710, 711, 500; 267/177, 179, 178, 170; 254/10.5

[56] References Cited

U.S. PATENT DOCUMENTS

| | | | |
|---|---|---|---|
| 513,043 | 1/1894 | Hall | 172/265 |
| 868,714 | 10/1907 | Skidmore | 172/705 |
| 1,041,975 | 10/1912 | Dennis | 172/265 |
| 3,279,104 | 10/1966 | Wandscheer et al. | 172/265 |
| 3,700,039 | 10/1972 | Essex et al. | 172/265 |
| 3,782,481 | 1/1974 | Quanbeck | 172/265 |
| 3,912,224 | 10/1975 | Castoe | 254/10.5 |
| 4,011,916 | 3/1977 | Neal et al. | 172/705 X |
| 4,200,157 | 4/1980 | Anderson | 172/705 X |
| 4,261,423 | 4/1981 | Williamson | 172/705 |
| 4,321,971 | 3/1982 | Hake et al. | 172/710 |
| 4,520,878 | 6/1985 | Smith et al. | 172/705 |
| 4,679,780 | 7/1987 | Kloster | 267/177 |
| 4,683,959 | 8/1987 | Clemens | 172/705 X |
| 4,930,751 | 6/1990 | Hutchins | 254/10.5 |
| 5,787,992 | 8/1998 | Dobson et al. | 172/264 |

*Primary Examiner*—Christopher J. Novosad

[57] ABSTRACT

A spring trip standard for a tillage implement includes a coil spring compressed between an upper spring-abutting surface on the mounting bracket and a lower spring abutment surface on a casting which is connected by a transverse pivot to the mounting bracket. The casting includes an integral stop extending forwardly from the pivot and contacting the bottom of the bracket when the shank is in the ground working position so that a tension link between the bracket and casting is eliminated. The casting includes a spring abutment surface having a first portion which extends generally perpendicular to the spring axis to support the lowermost end of the spring when the shank is stopped in the normal working position. The opposite side of the spring abutment surface is angled relative to the first portion, and the lowermost coil of the compressed spring, when the standard is in the tripped position, abuts the opposite side to maintain the spring in a non-buckling state. The lowermost coil is maintained generally perpendicular to the centerline of the coil spring in the field-working and tripped positions so that spring buckling and spring fatigue caused by buckling are reduced or eliminated.

11 Claims, 2 Drawing Sheets

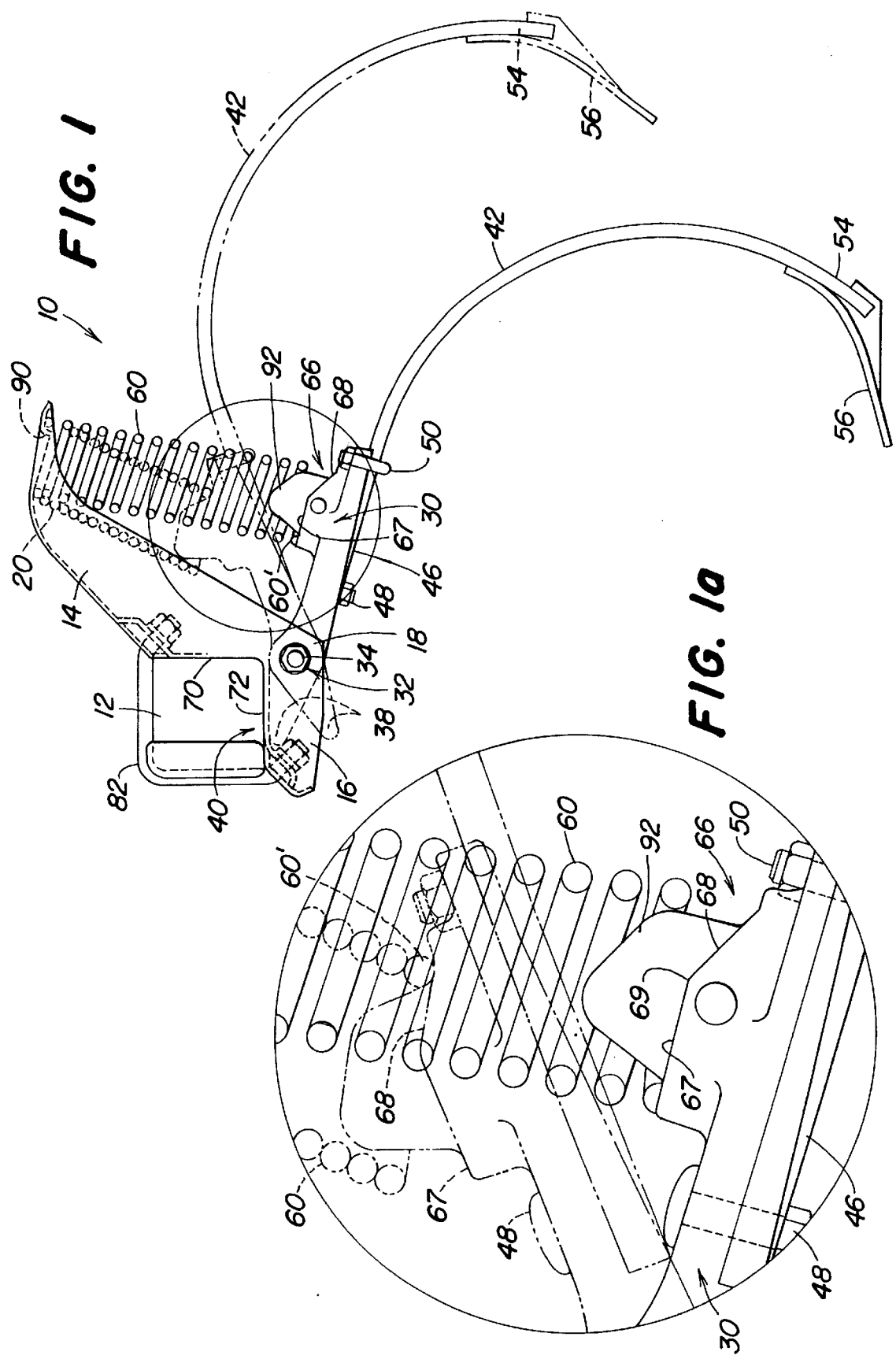

SPRING TRIP STANDARD HAVING REDUCED SPRING BUCKLING FORCES

BACKGROUND OF THE INVENTION

1) Field of the Invention

The present invention relates generally to agricultural implements and, more specifically, to a spring trip standard for tillage implements.

2) Related Art

Spring trip standards typically include a mounting bracket attached to rectangular toolbar and extending upwardly and rearwardly to a downwardly and forwardly directed spring abutment surface. A spring is compressed between the abutment surface and an upwardly directed spring abutment surface on a support member pivotally connected to the lower portion of the bracket. A tool-supporting shank is fixed to the member. As the tool encounters obstacles, the support member and shank pivot upwardly against the bias of the spring so the tool can move over the obstacle. The angle of the lower spring abutment surface relative to the spring centerline changes as the support member pivots upwardly. The change in angle introduces spring buckling forces and causes the spring to curve so the lowermost spring coil is maintained against the spring abutment surface. The buckling action reduces the effectiveness of the spring and can result in premature spring breakage.

To reduce shank assembly complexity and reduce manufacturing time and costs, some spring trip standards include integral stops so that a tension link extending through the coils of the spring is obviated. One such standard is shown and described in our copending U.S. patent application Ser. No. 09/216,270, filed Dec. 18, 1998 and entitled SPRING TRIP STANDARD. The tension link provided a built-in spring guidance feature to help reduce excessive spring buckling, and therefore standards without such links, such as shown in our above-referenced application, are more prone to have spring buckling problems.

In some spring trip shank assemblies, such as shown in U.S. Pat. No. 4,520,878, the bottom of the coil spring rests on a seat which can swivel to maintain the lower face of the spring substantially normal to the longitudinal axis of the spring and thereby reduce spring buckling forces. In another type of assembly shown in U.S. Pat. No. 3,700,039, the lower end of the coil spring is free to rock on a clamp bolt to remain normal to the centerline of the spring. Such arrangements require numerous components and are relatively difficult to assemble. The swiveling seat construction and the bolt support arrangement introduce additional wear components into the assembly.

BRIEF SUMMARY OF THE INVENTION

It is therefore an object of the present invention to provide an improved spring trip assembly for an implement. It is a further object to provide such an assembly which overcomes most or all of the aforementioned problems.

It is a further object of the present invention to provide an improved spring trip assembly which has reduced spring buckling compared to most previously available assemblies. It is a further object to provide such an assembly which is relatively simple and inexpensive in construction. It is yet a further object to provide such an assembly which does not require a pivoting spring abutment surface.

It is another object to provide an improved spring trip shank assembly wherein spring buckling forces are kept to a minimum during tripping of the shank. It is another object to provide such an assembly which obviates a tension link or spring guide.

It is still another object of the invention to provide an improved spring trip shank assembly without a tension link which is easy to assemble and disassemble and which has a minimum number of wear areas. It is yet another object to provide such an assembly which does not require a pivoting spring seat or a spring retainer extending through the coils of the spring.

A spring trip standard for a tillage implement includes a coil spring compressed between an upper spring-abutting surface on the mounting bracket and a lower spring abutment surface on a casting connected by a transverse pivot to the mounting bracket. The casting includes an integral stop extending forwardly from the pivot and contacting the bottom of the bracket when the shank is in the ground working position so that a tension link between the bracket and casting is eliminated. The casting includes a spring abutment surface having a first portion which extends generally perpendicular to the spring axis when the shank is stopped in the normal working position to support the lowermost end of the spring. The opposite side of the spring abutment surface is angled relative to the first portion and abuts the lowermost coil of the compressed spring coils in the tripped position to maintain the spring in a generally non-buckling state. A generally perpendicular alignment of the lower coil relative to the centerline of the coil spring is maintained in both the field-working and the tripped positions so that spring buckling and spring fatigue caused by buckling are reduced or eliminated. The shank assembly has a minimal number of components and is relatively inexpensive and easy to assemble. Spring buckling problems are virtually eliminated without need to introduce additional pivots, components or other wear areas.

These and other objects, features and advantages of the present invention will become apparent to one skilled in the art upon reading the following detailed description in view of the drawings.

BRIEF DESCRIPTION OF THE DRAWINGS

FIG. 1 is a side view of a spring trip shank assembly showing the shank in the normal field-working position (solid lines) and the tripped position (broken lines).

FIG. 1a is an enlarged view of the circled area of the shank assembly of FIG. 1.

DETAILED DESCRIPTION OF THE DRAWINGS

Figure 4:
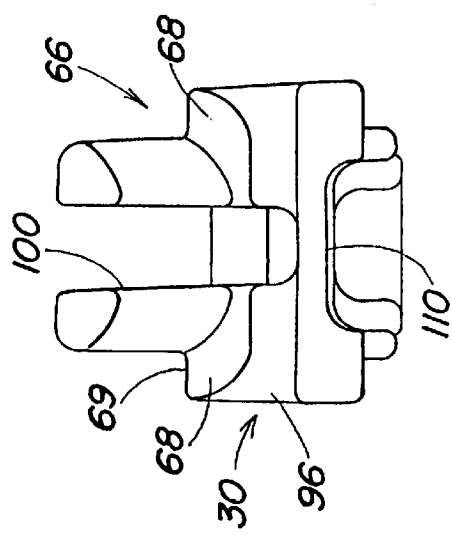
FIG. 4 is a rear view of the casting of FIG. 2.

Referring now to FIG. 1, therein is shown a spring trip standard assembly 10 connected to a transversely extending implement toolbar 12 of rectangular cross section. The assembly 10 includes a rearwardly opening, channel-shaped bracket 14 having a forward mounting portion 16, a lower rear pivot area 18 and an upper spring-abutting surface 20 located rearwardly and above the pivot area 18.

Figure 3:
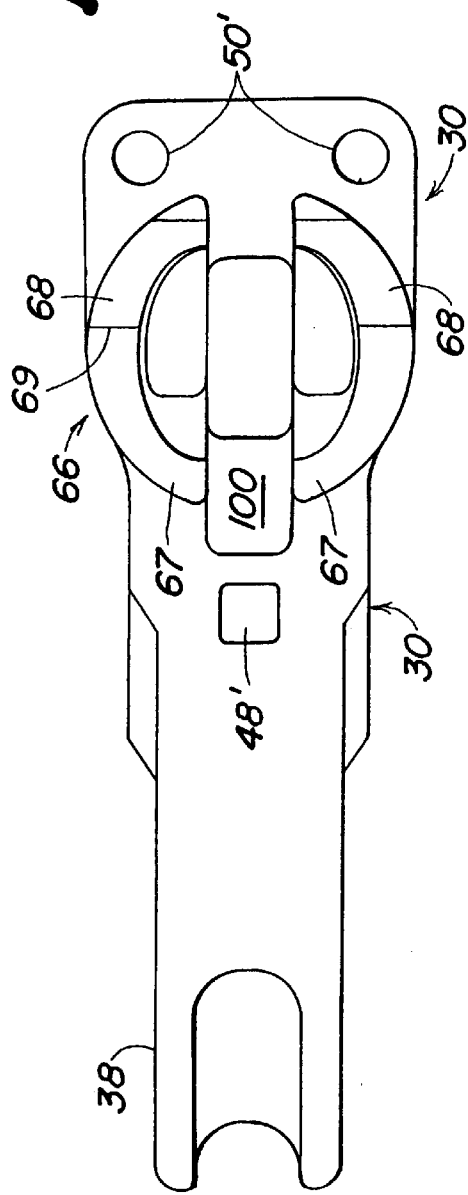
FIG. 3 is a top view of the pivot casting of FIG. 2.
Figure 2:
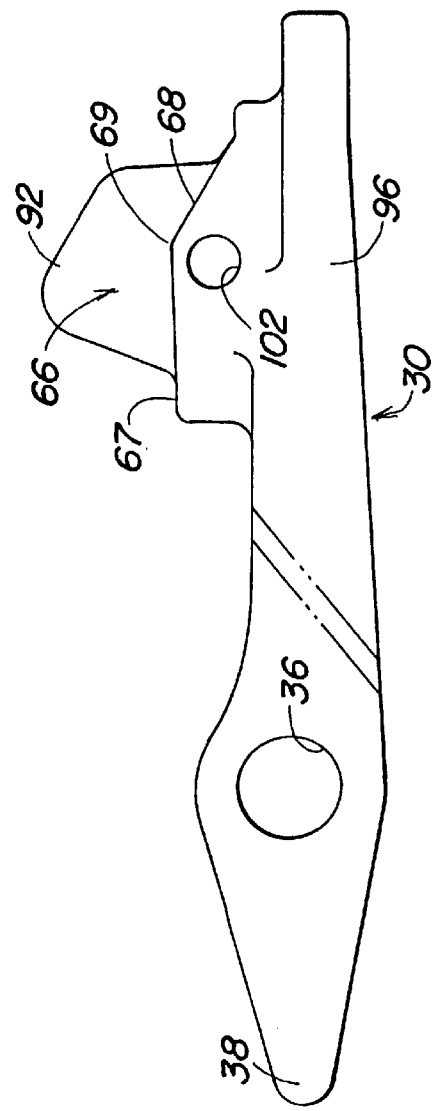
FIG. 2 is an enlarged side view of the pivot casting for the shank assembly of FIG. 1.

A shank support casting 30 is pivotally connected to the rear pivot area 18 by a bushing and sleeve assembly 32 including a mounting bolt 34 with chrome-plated steel bushing extending through a bore 36 (FIG. 2) in the casting between the sides of the bracket 14 below the forward, lowermost corner of the mounting portion 16. The casting 30 includes a fore-and-aft extension 38 projecting forwardly from the bore 36 and pivot area 18 under the mounting portion 16 and defining a down stop area indicated generally at 40 which limits downward (clockwise as viewed in FIG. 1) pivoting to establish a preselected field-working position as shown by the solid lines in FIG. 1. A C-shaped shank 42 includes an apertured upper end 46 connected by a bolt 48 to the casting 30. The bolt 48 extends through the upper end 46 and through a hole 48' (FIG. 3) in the casting 30. A U-bolt 50 extending around the shank 42 and through holes 50' in the casting 30 secures the upper end 46 to the aft end of the casting 30. The shank 42 curves downwardly and forwardly from the end 46 to a lowermost tool-receiving end 54 supporting an earthworking member or shovel 56.

A coil spring 60 is freely compressed between the upper spring-abutting surface 20 and a lower spring-abutting surface 66 on the casting 30 independently of any tension link or spring guide structure within the coils of the spring. The spring 60 is precompressed to provide the spring trip force that a tillage spring trip standard is rated at in the field-working position with the downstop 40 bottomed out as shown by the solid lines in FIG. 1. The field working position of the assembly 10, with the downstop bottomed out, provides the proper sweep to soil relationship. The precompression of the spring 60 in combination with the action of the downstop 40 loads the pivot to prevent looseness in the bushing and sleeve assembly 32. The spring-abutting surface 66 includes a first spring-receiving portion or surface 67 which is generally parallel to the upper spring-abutting surface 20 and supports the lowermost coil (60') when the shank 42 is in the field-working position and a second spring-receiving portion or surface 68 which is generally parallel to the surface 20 and supports the coil 60' when the shank approaches the uppermost tripped position (broken lines of FIG. 1 and 1*a*). The offset portions 67 and 68 are connected by a transition area 69 and prevent excessive buckling of the spring 60 by maintaining the lowermost coil 60' normal to the spring centerline in both the field-working and the tripped positions.

The channel-shaped bracket 14 includes a notch 70 which abuts the rear and bottom faces of the toolbar 12. The pivot area 18 is located below the aft portion of the notch 70, and the stop area 40 includes a bracket surface 72 having an upper side which abuts the lower face of the toolbar 12 to provide a solid stop for the casting extension 38. A conventional U-bolt clamping arrangement 82 extends around the toolbar 12 and through apertures in the bracket 14 to secure the assembly 10 to the toolbar.

The upper spring-abutting surface 20 of the bracket 14 includes a circular indentation or downward projection 90 for maintaining the upper end of the coil spring 60 centered on the surface. A lower spring retaining projection 92 extends upwardly from base 96 adjacent the surfaces 67 and 68 on the casting 30 to help locate the lower end of the coil spring 60 relative to the spring-abutting surface 66. The base 96 and the projection 92 are slotted to define a fore-and-aft extending notch 100 to facilitate factory assembly. A transverse bore 102 extends through the base 96. The notch 100 and the bore 102 facilitate field disassembly and reassembly, if necessary. The bottom of the casting 30 includes a fore-and-aft extending cavity 110 (FIG. 4) opening rearwardly and downwardly and conforming generally to the shape of the upper end 46 of the shank 44. A thin hardened split sleeve is pressed into the bore 36 and receives the chrome-plated steel bushing and mounting bolt 34. The bolt 34 is tightened against the sides of the bracket 14 and clamps the steel bushing so the split sleeve rotates on the stationary bushing. Therefore, the only wear that occurs in the pivot area 18 is in the bushing and sleeve which are relatively inexpensive and easy to replace. By eliminating a pivoting lower bracket or coil supporting pin and using the sectioned lower spring-abutting surface 66 to maintain the coil 60' normal to the spring centerline in the field-working position and in the tripped position, another potential wear pin area is eliminated.

In operation, the shank 42 is normally operating in the field-working position shown by the solid lines in FIGS. 1 and 1*a*. The lowermost coil 60' of the spring 60 rests on the forward surface 67 which is generally parallel to the upper spring-abutting surface 20 so that the spring has virtually no buckling forces in its preloaded field-working position (solid lines of FIG. 1 and 1*a*). If an obstacle is encountered by the tool 56, the shank 42 will start to trip, the spring 60 will start to compress, and the central portion of the spring will begin to bow forwardly towards the toolbar 12 as the angle of the surface 67 changes relative to the spring-abutting surface 20. However, if the shank 42 continues to trip upwardly, the lowermost coil 60' will rock from the position where it rests on the forward surface 67 to a position where it rests on the aft surface 68 which is approaching an attitude which is generally parallel to the upper spring-abutting surface to substantially reduce the spring-buckling forces. In the maximum tripped position, the surface 68 is generally parallel to the surface 20 so that the coil 60' is normal to the spring centerline and no buckling forces are present in the spring 60. The coils of the spring 60 can therefore bottom fully against each other in the fully tripped position. The unique spring support arrangement therefore optimizes the effectiveness of the spring 60 in the field-working and fully tripped positions and substantially eliminates spring buckling and breaking problems without need for wear-prone spring support pins or pivoting spring brackets.

Having described the preferred embodiment, it will become apparent that various modifications can be made without departing from the scope of the invention as defined in the accompanying claims. For example, more than two angled surfaces 67 and 68 or a flattened transition area 69 may be used to establish an intermediate stable support position.

What is claimed is:

1. A spring trip standard assembly adapted for mounting on a toolbar, the spring trip standard assembly adapted for supporting a tool and moving the tool forwardly through the ground, comprising:

a bracket adapted for securing to the toolbar, the bracket including an upper spring-abutting surface and a lower pivot area;

a shank member pivotally connected to the lower pivot area and extending rearwardly and downwardly therefrom to a tool-supporting end;

a lower spring-abutting surface located on the shank member rearwardly of the pivot area and below the upper spring-abutting surface;

a coil spring compressed between the spring-abutting surfaces and biasing the tool-supporting end towards a ground engaging position; and wherein the lower spring-abutting surface includes a first portion maintaining the spring in generally a non-buckling state when the end is in the ground-engaging position and a second portion offset with respect to the first portion and maintaining the spring in the non-buckling state when the end is tripped upwardly and the coil spring is compressed.

2. The spring trip standard assembly as set forth in claim 1 wherein the first and second portions are fixed relative to each other, and the coil spring includes a lowermost coil resting on the first portion when the end is in the ground-engaging position and on the second portion when the end is in the tripped position.

3. The spring trip standard assembly as set forth in claim 1 wherein the first portion includes a spring-contacting surface generally parallel to the upper spring abutting surface when the tool supporting end is in the ground engaging position and the second portion includes a spring contacting surface generally parallel to the upper spring abutting surface when the end is tripped upwardly.

4. The spring trip standard assembly as set forth in claim 1 wherein the coil spring has substantially open coils free of spring control structure between the spring-abutting surfaces.

5. The spring trip assembly as set forth in claim 4 wherein the second portion is planar and when the assembly is in the upwardly tripped position, the second portion is generally parallel to the upper spring-abutting surface.

6. The spring trip assembly as set forth in claim 5 wherein the first portion is planar, and wherein the first and second portions are angled with respect to each other.

7. A spring trip standard for a tillage implement adapted for forward movement over the ground, the standard including a mounting bracket having an upper spring-abutting surface, a shank support including a pivot connected to the mounting bracket and a lower spring-receiving surface located below the upper spring-abutting surface, the shank support rockable between a lower, field-working position and an upper tripped position, a coil spring compressed between the upper spring-abutting surface and the lower spring-receiving surface, the angle of the lower spring-receiving surface changing relative the spring centerline as the shank support rocks between the field-working and tripped positions, wherein the spring-receiving surface includes a first portion supporting a lowermost coil of the spring when the shank support is in the field-working position and a second portion angled with respect to the first portion and supporting the lowermost coil when the shank support is in the tripped position, the first portion substantially normal to the spring centerline in the field-working position and the second portion substantially normal to the spring centerline in the tripped position so that spring buckling forces are reduced.

8. The spring trip shank assembly as set forth in claim 7 wherein the shank support includes a spring receiving projection to help maintain the coil spring in position on the spring receiving portion.

9. The spring trip shank assembly as set forth in claim 7 wherein the first and second portions comprise surface portions offset relative to each other, the spring including a lowermost coil resting on a different surface portion dependent upon the tripped position of the shank support.

10. The spring trip shank assembly as set forth in claim 9 including a spring receiving projection extending upwardly from an area adjacent the surface portions to help maintain the coil spring in position on the spring receiving portion.

11. The spring trip standard assembly as set forth in claim 9 wherein the lowermost coil rocks from one surface portion to the other surface portion at a shank support location intermediate the field-working and tripped positions.

* * * * *